(12) United States Patent
Abegglen et al.

(10) Patent No.: US 9,694,969 B2
(45) Date of Patent: Jul. 4, 2017

(54) BEVERAGE PRODUCTION SYSTEM AND CAPSULE WITH FORCE RING

(75) Inventors: Daniel Abegglen, Rances (CH);
Alexandre Perentes, Lausanne (CH);
Carlo Magri, Collombey (CH);
Arnaud Gerbaulet, Oye et Pallet (FR)

(73) Assignee: Nestec S.A., Vevey (CH)

( * ) Notice: Subject to any disclaimer, the term of this patent is extended or adjusted under 35 U.S.C. 154(b) by 902 days.

(21) Appl. No.: 13/982,148

(22) PCT Filed: Jan. 28, 2011

(86) PCT No.: PCT/EP2011/051241
§ 371 (c)(1),
(2), (4) Date: Jul. 26, 2013

(87) PCT Pub. No.: WO2012/100836
PCT Pub. Date: Aug. 2, 2012

(65) Prior Publication Data
US 2013/0309371 A1    Nov. 21, 2013

(51) Int. Cl.
*B65D 85/804*      (2006.01)
*A47J 31/22*       (2006.01)

(52) U.S. Cl.
CPC .......... *B65D 85/8043* (2013.01); *A47J 31/22* (2013.01); *Y10T 29/49* (2015.01)

(58) Field of Classification Search
CPC ............................. B65D 85/8043; A47J 31/22
See application file for complete search history.

(56) References Cited

U.S. PATENT DOCUMENTS

2010/0239734 A1* 9/2010 Yoakim ................... A47J 31/22
426/433

FOREIGN PATENT DOCUMENTS

| EP | 1654966 | 5/2006 |
|---|---|---|
| EP | 1849715 | 10/2007 |
| JP | 2009534143 | 9/2009 |
| WO | WO2008148646 | 12/2008 |
| WO | 2010066705 | 6/2010 |

OTHER PUBLICATIONS

Oxford English Dictionary, Definition of the term "Embossed", [on line] retrieved Nov. 29, 2016, retrieved from the Internet: URL:<http://www.oed.com/view/Entry/60945.*

* cited by examiner

*Primary Examiner* — Erik Kashnikow
*Assistant Examiner* — Chaim Smith
(74) *Attorney, Agent, or Firm* — K&L Gates LLP

(57) ABSTRACT

The present invention relates to a capsule (1) designed for insertion in a beverage production device (23) for preparing a beverage from a substance contained in the capsule by introducing liquid in the capsule and passing liquid through the substance using centrifugal forces, the capsule comprising: —a body (2) comprising a bottom end and an open end; —an upper wall (3) for covering the body at its open end; —an enclosure (14) between the body and upper wall containing a predetermined amount of beverage substance; the capsule comprising a flange-like rim (4) extending outwardly from the body (2), wherein the flange-like rim comprises an annular force ring (8) designed for being engaged by an enclosing member (49) of a dedicated beverage production device (23), wherein the force ring comprises at least one curved, folded part (16) forming of at least one ply of material.

12 Claims, 8 Drawing Sheets

BEVERAGE PRODUCTION SYSTEM AND CAPSULE WITH FORCE RING

CROSS REFERENCE TO RELATED APPLICATIONS

The present application is a National Stage of International Application No. PCT/EP2011/051241, filed on Jan. 28, 2011, the entire contents of which are being incorporated herein by reference.

FIELD OF THE INVENTION

The present invention relates to a system and a capsule for preparing a beverage from a beverage substance contained in the capsule by passing a liquid through the substance using centrifugal forces.

In particular, the present invention relates to a capsule having a deformed rim constituting an engagement portion which is adapted for being engaged by a dedicated valve member of a beverage production device, thereby forming a restricted liquid flowpath for the centrifuged liquid.

BACKGROUND OF THE INVENTION

It exist systems for preparing beverages such as coffee by forcing a liquid through the substance contained in the capsule using centrifugal forces.

WO 2008/148604 for example relates to a capsule for preparing a beverage or liquid food from a substance, in a centrifugal brewing unit, by passing water through the substance contained in the capsule by using brewing centrifugal forces comprising: an enclosure containing a predetermined dose of substance; opening means which opens under the centrifugal effect to allow the brewed liquid to leave the capsule. The capsule may also comprises means for engaging the capsule to external rotational driving means of a centrifugal brewing device wherein the engaging means are configured to offer a resistance to torque during rotation of the capsule for maintaining the capsule in a reference rotational position.

Thereby, the effect of centrifugal forces to brew coffee or prepare other food substances presents many advantages compared to the normal brewing methods using pressure pumps. For example, in traditional espresso or lungo coffee type brewing methods using a pressure pump, it is very difficult to master all the parameters which influence the quality of extraction of delivered coffee extract. These parameters are typically the pressure, the flow rate which decreases with the pressure, the compaction of the coffee powder which also influences the flow characteristics and which depends on the coffee ground particle size, the temperature, the water flow distribution and so on. Therefore, it is not easy to vary the extraction pressure and flow rates because there are essentially determined by the resistance of the bed of coffee and the downstream filtering system.

For a centrifugal extraction, the quality of the beverage to be prepared (intensity or strength, taste, aroma, foam/crema, etc.) is complex and depends on the control of different brewing parameters and capsule design. In particular, the flow rate of the injected liquid in the capsule seems to play an important role. The flow rate can be influenced by a number of parameters such as the rotational speed of the capsule in the device, the fluid dynamics inside the capsule, the back-pressure exerted on the centrifuged liquid. For instance, for a given back-pressure, the higher the rotational speed, the larger the flow rate. Conversely, for a given rotational speed, the larger the back-pressure, the smaller the flow.

Whereas the rotational speed of the capsule is usually controlled by control means selectively activating a rotational motor of a centrifugal beverage production device, a predefined back-pressure is preferably obtained by a flow restriction at the outlet of the capsule or at the outside of a centrifugal cell carrying the capsule.

For example EP 651 963 teaches that a pressure gradient is obtained by a rubber-elastic element interposed at the interface between the lid and the cup of the centrifugal cell, e.g., a capsule containing coffee powder. Such an element deforms elastically to leave a filtering passage for the liquid when a certain pressure is attained at the interface.

Furthermore, documents FR 2 487 661 and WO 2006/112691 relate to centrifugal systems wherein a fixed restriction is placed downstream of the filter to create a pressure gradient.

Moreover, WO 2008/148646 proposes a solution in which a flow restriction is placed in or outside the centrifugal cell. The flow restriction can comprise a regulating valve offering an effective pressure. The valve opens under the effect of pressure. The more the valve opens, the higher the flow rate. The valve can be preloaded by a resilient element (rubber or spring).

EP-A-1849715 relates to a capsule for the preparation of a beverage with a sealing member attached thereto and comprising a crimping portion of the flange-like rim for the sealing member forming a curled end. However, such capsule is not designed for delivering a beverage, e.g., coffee extract, by centrifugal extraction.

The prior art centrifugal beverage production systems however suffer from the drawback that an adaptation of the back-pressure to predefined values either requires a mechanism that makes it complex to adjust to a large variety of different predefined values of the back-pressure.

Thereby, it is to be understood that in particular with respect to coffee beverages, the back-pressure applied on the centrifuged liquid determines the extraction conditions (e.g., flow rate) thereby influencing directly the coffee taste and aroma. Furthermore, the organoleptic texture such as the foam/crema formed on top of the prepared beverage highly also depends on the applied back-pressure. Thus, with respect to the foam/crema as well as the flow rate of a coffee beverage to be prepared, it is desired to adjust the values of the back-pressure dependent on the nature of the ingredient provided in a specific capsule as for different types of beverages a different quality and/or quantity of the foam/crema respectively a different flow rate is desired.

Therefore, there is a need for proposing a new centrifugal capsule system for which the back-pressure exerted on the centrifuged at the interface between the capsule and the device can be better and more independently controlled for improving quality of the delivered food liquid.

The term "back-pressure of the valve means" refers to the pressure loss created by the restriction or restriction valve. As the restriction or restriction valve forms a "bottleneck effect", a pressure of liquid is created upstream of it by the effect of the centrifugation. Thanks to this restriction, the pressure before the restriction is increased, and it is this pressure which has an effect on the liquid-ingredients interaction (e.g. by extraction of the ingredients by the liquid). This pressure created by the restriction valve can also be defined as the ratio of force ("back-force") divided by the area of surface contact at the restriction valve.

Co-pending European patent application No. 08171069.1 proposes a capsule on which a force ring is provided that is engaged by a pressing surface of the beverage preparation device to form a valve means which provides, under the force of resilient means associated to the pressing surface, and depending on the height or thickness of the force ring, a certain back-pressure during beverage extraction.

The present invention provides an improved solution to the capsule of European patent application No. 08171069.1, in particular, a capsule that resists deformation under the compressive forces applied by the pressing surface of the device onto the force ring for a better control of the back-pressure. The proposed solution is also economical and can be reliably produced in mass production with a high respect of the dimensional tolerances. Furthermore, the proposed solution also allows the use of materials providing high gas barrier properties, e.g., aluminium, without need for additional elements on the capsule therefore providing a relatively simple capsule.

The present invention provides a solution to the beforementioned problems as well as offers additional benefits to the existing art.

OBJECT AND SUMMARY OF THE INVENTION

In a first aspect, the present invention proposes a capsule designed for insertion in a beverage production device for preparing a beverage from a substance contained in the capsule by introducing liquid in the capsule and passing liquid through the substance using centrifugal forces, the capsule comprising:
a body comprising a bottom end and an open end,
an upper wall for covering the body at its open end,
an enclosure between the body and upper wall containing a predetermined amount of beverage substance,
the capsule comprising a flange-like rim extending outwardly from the body, wherein the flange-like rim comprises an annular force ring designed for being engaged by an enclosing member of a dedicated beverage production device, wherein the force ring comprises at least one curved, folded part forming of at least one ply of material.

The capsule of the invention is more particularly provided with a central axis of symmetry and an upper wall with a dedicated outlet area which is positioned circumferentially distant from the central axis above the enclosure to enable the centrifuged beverage to be released from the capsule by effect of the centrifugal forces exerted in the capsule when rotated along its central axis of symmetry in the beverage producing device. In a preferred mode, the dedicated outlet area is a portion of a perforable membrane which constitutes the upper wall. Furthermore, in order to provide improved in-cup quality during the centrifugation of the capsule, the beverage substance, in particular, when the substance is essentially roast and ground coffee, to provide sufficient centrifugal forces at the dedicated outlet area and force ring, the external diameter of the capsule lies between 50 and 70 mm, more preferably between 52 and 61 mm.

The annular force ring forms with a dedicated pressing surface of the beverage production device a restriction valve means for the flow of beverage. The force ring is more particularly configured to selectively block the flow path of the centrifuged liquid in order to delay its release from the capsule and adjust the flow rate as a function of the speed of rotation. More particularly, when a sufficient pressure of the centrifuged liquid is reached at the valve means, i.e., the centrifuged liquid forcing against the force ring, the valve means opens, i.e., a restricted flow gap is provided by a pressing surface of the device moving away from the force ring of the capsule or vice versa. Before the pressure of the centrifuged liquid is attained, the valve means remain closed. Hence, the force ring blocks the flowpath for the centrifuged liquid. It should be noted that the opening of the valve means depends on the rotational speed of provided driving means which drive the capsule in rotation in the beverage production device. Therefore, as the valve means selectively block the flowpath for the centrifuged liquid, a preliminary wetting step of the beverage substance, e.g., ground coffee, can be carried out as no liquid is yet discharged from the device. As a result of a prewetting and delayed release of the beverage, a thorough wetting of the substance is made possible and the interaction time between the liquid and the beverage substance, e.g., coffee powder, substantially increases and the extraction characteristics, e.g., coffee solid content and beverage yield, can be significantly improved.

Moreover, due to the curved, folded part forming at least one ply of material, a reinforcement of the force ring constituting an engagement portion of the capsule is obtained. Furthermore, the at least one ply has substantially the same thickness of material as the rim outside the part. Hence, the force ring precision of the dimension is controlled and it remains of a relatively constant dimension during the beverage preparation operations in a dedicated beverage preparation device in order for the force ring to play its role of restriction of the beverage flowpath and to ensure a reliable opening. Accordingly, resilience of the force ring which may lead to variances of the liquid pressure necessary to overcome the defined back-pressure of the pressing surface being exerted onto the force ring is controlled.

In the detailed description and figures of the present application, the definition of the term 'ply' will appear clearer to the skilled person. It refers more particularly to a mono- or multilayer portion of material forming a substantially rigid extension of the force ring.

In a preferred embodiment, the said upwardly curved, folded part is an embossed substantially rigid section of the flange-like rim.

Thereby, the term 'rigid' refers to the feature of the curved, folded part being not collapsible under compression by the enclosing member when acting as a restriction valve means. Accordingly, the force ring is prevented from collapsing under the load exerted by the pressing surface of the beverage production device. Furthermore, a rigid and thus stable engagement portion constituted by the force ring is provided which enables a reliable interaction of the pressing surface of a dedicated beverage production device and the capsule according to the present invention according to predefined operational values regarding the exerted back-pressure.

In a preferred embodiment, the curved, folded part is folded to form at least two or multiple folded plies when seen in cross-sectional side view. Accordingly, the rigidity of the force ring is further enhanced.

Preferably, the two or multiple folded plies are substantially adjacent including a reentrant ply. Accordingly, due to the two or multiple folded plies being arranged adjacent to each other, the form stability of the force ring is effectively enhanced. Thereby, the reentrant ply of the force ring preferably extends from an outer annular section of the force ring to an inner section of the embossed curved, folded part, thus contributing to the form stability of the force ring.

In another preferred embodiment, the two or multiple plies are distant to form a hollow structure or a filled structure containing a filling and/or reinforcing material. Thereby, the hollow structure may be of a particular cross sectional shape in order to provide a rigid force ring and thus, to obtain a structure of high form stability. Furthermore, the form stability may be increased due to a filling respectively reinforcing material which is preferably provided between the two or multiple plies.

In a preferred embodiment, the curved folded part is a single ply which is formed into a sufficiently rigid and stable shape.

In a preferred embodiment, the curved folded part of the force ring extends, in a direction opposite to the capsule body and beyond a plane in which the portion of the flange-like rim the upper wall is sealed on, by a distance of extension from said plane. Moreover, the flange-like rim of the capsule is preferably free of any extension below the plane in which the upper wall of the capsule extends or has an extension shorter than the distance of extension (h) above the plane (P).

The curved folded part of the force ring is preferably integrally formed with the capsule body. Therefore, for essentially economical reasons, the curved folded part of the force ring can be formed in one piece together with the body of the capsule.

In a preferred embodiment, the force ring extends by a distance of extension from a plane in which the upper wall of the capsule is arranged. Thereby, the distance of extension preferably lies between 0.5 and 10 mm, preferably 0.8 and 5 mm. Accordingly, the height of the force ring is arranged at a fixed distance with regard to the upper wall of the capsule. Thereby, the height of the force ring may take variable measures in order to adapt the back-pressure exerted onto the force ring during enclosure of the capsule in a dedicated beverage production device to a predefined value. Hence, the back-pressure from the pressing surface onto the capsule can be adjusted and thus, at least the flow rate, the crema quality and/or the crema quantity of the beverage to be prepared can be adjusted dependent e.g. on the nature of the substance provided in a specific capsule and/or the amount of beverage substance provided within the capsule. Furthermore, capsules with different measures of force rings enables to reduce the useful range of rotational speed while still covering a large range of different flow rates. Therefore, the device can be run at lower speeds thereby providing less mechanicals constraints, potentially less noise and vibrations.

It is to be noted that the force ring preferably extends in a direction essentially perpendicular to the plane in which the upper wall of the capsule is arranged. Thereby, the force ring may as well extend in a direction to form a slanted angle between preferably 2 and 15 degrees with a rotational axis of the capsule body.

In a preferred embodiment, the force ring of the capsule is made of aluminium or a multilayer of aluminium and polymer, e.g., aluminium-PP.

In a preferred embodiment, the force ring is of essentially inverted U- or V-shaped open form. However, the force ring may as well be constituted by another geometric form suitable to enable a provision of a rigid and stable engagement means.

In another preferred embodiment, the force ring comprises a cross-section of essentially inverted U-shaped form thereby having a bent section, a junction section and a free end. Thereby, a circumferential edge at the free end of the U-shaped force ring is preferably distanced by a certain distance from the plane in which the rim of the capsule extends.

In another aspect, the present invention proposes a capsule insertable in a beverage production device for preparing a beverage from a substance contained in the capsule by introducing liquid in the capsule and passing liquid through the substance using centrifugal forces, the capsule comprising:
a body comprising a bottom end and an open end,
an upper wall for covering the open end of the body,
an enclosure between the body and upper wall containing a predetermined amount of beverage substance,
the capsule comprising a flange-like rim having a force ring, forming at least one embossed protruding ply of inverted U or V-shape extending from the plane at which the upper wall extends and opposite to the bottom of the body; for being engaged by an enclosing member of a dedicated beverage production device.

According to the invention, a force ring is provided having at least one embossed protruding ply which enables to provide a form-stable section of the capsule designed to form valve means when interacting with a dedicated pressing surface of a beverage production device.

In the context of the invention, the body of the capsule can comprise aluminium and/or plastics. The body can also be made of plastics only. Other package materials for the capsule can be used such as paper or cardboard.

The capsule according to the present invention can be formed of gas barrier material and closed by the upper wall respectively membrane of the capsule in a gas impervious manner so that the freshness of the beverage substance, e.g., roast and ground coffee particles, is maintained for a prolonged period of time.

The membrane preferably comprises at least a peripheral perforable area neighbouring a sealing portion of the membrane which is preferably sealed onto the flange-like rim of the body. Hence, the perforable area can be perforated by perforating means of the beverage production device for providing a series of liquid outlets in the capsule. Therefore, liquid being centrifuged in the capsule can leave the capsule via the series of outlets, then, it can exert pressure onto the force ring of the capsule. When the opening pressure is reached, the valve means open forming a flow restriction gap and the liquid can be centrifuged outside of the capsule and be collected for being dispensed.

In a possible alternative, the capsule of the invention comprises a liquid- and/or gas-porous wall member instead of a perforable membrane. The porous wall member may be formed of paper, plastic, textile and/or aluminium. The body of the capsule may also be formed of paper, cardboard or another biodegradable material.

In another preferred embodiment, the capsule may be a refillable capsule comprising a lid member preferably attached to the body of the capsule in order to enable an enclosure of ingredient substance provided to the interior of the capsule. Hence, a user may provide a preferred ingredients substance to the capsule body for meeting his/her taste preferences.

In another possible mode, the capsule comprises an internal filter element inserted in the preferably cup-shaped body. The capsule can be closed by a lid membrane covering the internal filter. The lid membrane can be perforable or peelable. For instance, the internal filter element can be a plastic piece with filtering holes or slots for filtering the centrifuged liquid such as described in WO2008/148646.

The capsule according to the present invention can comprise a substance which is extractable, e.g., ground coffee or soluble, e.g., milk powder. In particular the substance can be chosen amongst ground coffee, instant coffee, chocolate, cocoa powder, leaf tea, instant tea, herbal tea, a creamer/whitener, a nutritional composition (e.g., infant formula), dehydrated fruit or plant, culinary powder and combinations thereof The capsule may include a gas with the food substance such as nitrogen and/or carbon dioxide.

Preferably, the capsule comprises gas barrier materials enveloping the compartment containing the substance. However, in case the capsule is not gastight 'per se', an outer package can be used to pack the capsule individually or in group of several capsules. In this case, the package is removed before the capsule is inserted in the device.

The invention further relates to the use of a capsule, as aforementioned, in a centrifugal beverage producing device wherein the capsule is centrifuged in the device and the annular force ring is engaged by an enclosing member of the dedicated beverage production device; such force ring forming part of a valve means for selectively blocking and/or restricting the flow of the centrifugal liquid coming out of the capsule.

In a preferred embodiment, the pressing surface of a dedicated beverage production device to be used in conjunction with the capsule according to the present invention forms a relatively flat annular surface onto which the force ring of the capsule can press. Hence, a closing action is promoted by an engagement at the valve means under the form of an annular sealing line. Preferably, the surface is substantially parallel to the flange-like rim of the capsule. Of course, the pressing surface could also have a slightly concave or convex line of curvature in radial direction relative to the axis of centrifugation.

It should be noted that the pressing surface and/or the capsule holder of a dedicated beverage production device is/are preferably associated to spring-loading means for enabling the opening of a flow restriction gap for the centrifuged liquid by the pressing surface moving relatively away from the force ring of the capsule. The spring-loading means can be, for instance, one or more helicoidal springs compressively acting on said pressing surface or any equivalent means. It should be noted that the flow restriction gap can be opened between the pressing surface and the capsule by a relative movement between each other. This relative movement can be obtained by either the pressing surface moving away from the capsule or the capsule moving away from the pressing surface such as by the capsule holder being the mobile element. A third option is to have both the pressing surface of the injection head and the surface supporting the capsule holder to move against the force of a spring-biasing means.

The invention also relates to the system comprising a capsule of the invention and a beverage production device. In particular, it relates to a system for preparing a beverage comprising a capsule according to any of the preceding claims and a beverage producing device by introducing liquid in the capsule and passing liquid through the substance using centrifugal forces, the beverage production device comprising:
a capsule holder for holding the capsule at least at the flange-like rim (4) during centrifugation,
rotational drive means for driving the capsule in centrifugation,
a liquid injecting means for feeding liquid in the capsule,
a spring-biasing valve member for engaging the force ring of the capsule when the capsule is inserted in the beverage production device to form together a flow restriction valve for the centrifuged liquid.

More particularly, the device comprises an annular pressing portion for closing the valve means by engagement with the force ring.

Furthermore, the device comprises a support portion of the capsule holder for holding the flange-like rim including the force ring when pressed by the annular pressing portion of the valve means. The support portion can form a stepped edge with an inner part and an outer part; wherein the inner part is lowered relatively to the outer part in a manner to be engaged, respectively, by the sealing portion of the rim and the force ring of the rim. Preferably, the force ring of the capsule comprises circumferential edge which is distanced from the plane of the sealing portion of the flange-like rim thereby enabling a firm support onto the outer part of the support portion of the capsule holder.

In a further aspect, the invention proposes a method for producing a capsule having an embossed force ring designed for being engaged by an enclosing member of a dedicated beverage production device, providing a curled section of substantially hollow shape and forming said curled section by embossing at least one convex portion of said section into a reentrant portion.

According to the method, a rigid force ring of the capsule is formed which enables to provide reliable valve means during interaction with a dedicated pressing surface of an enclosing member of a beverage production device.

In a preferred embodiment, the exertion of force during the embossing of the curled section of the capsule is specifically directed. Thereby, the thickness and/or the height of the force ring to be formed by the method can be preferably adjusted to predefined values. Thus, a force ring of predefined rigidity can be formed which is, due to its embossed section, able to withstand a high pressing force without deforming.

In a preferred embodiment, the reentrant portion is embossed in another convex portion of the section.

Moreover, the reentrant portion is preferably embossed into an opposite convex portion which is supported to resist deformation and to form, with said reentrant portion, a two-ply folded part with substantially no space left between the reentrant portion and the convex portion.

Accordingly, a multiple folded ply arrangement is obtained which forms a stable engagement portion of the capsule during beverage preparation.

It is to be noted that before the embossing of the curled section of the rim, the capsule body and a preformed rim are preferably formed, as a single piece, by deep drawing or any equivalent forming operation.

The term "substance" refers to any suitable food or beverage ingredients in particular: (but not necessarily limited to): ground coffee, soluble coffee, leaf tea, soluble tea, dairy powder, cocoa powder and combinations thereof.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

DETAILED DESCRIPTION OF THE FIGURES

Figure 1:
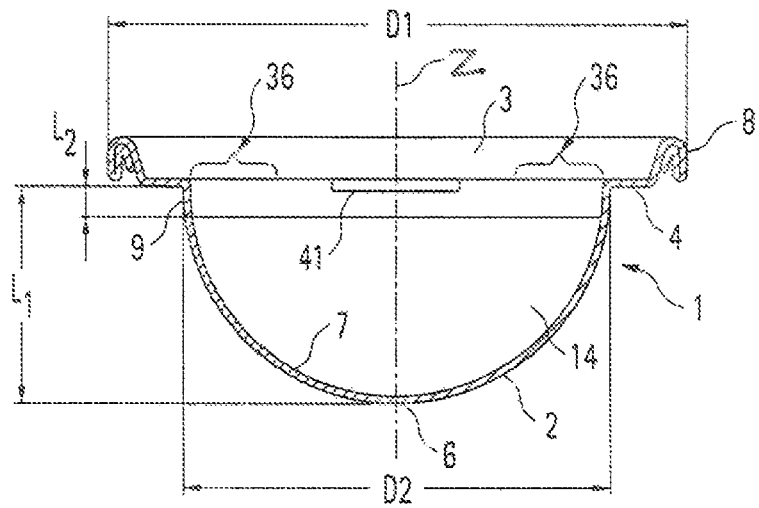
FIG. 1 is a cross sectional side view of a capsule of the system according to the invention.
Figure 2:
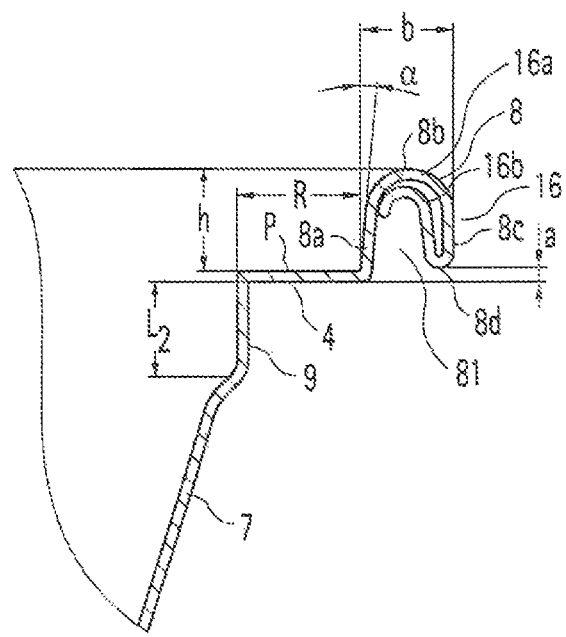
FIG. 2 is a sectional side view of a rim portion of the capsule of FIG. 1.

FIGS. 1 and 2 relate to a capsule 1 according to the present invention. Thereby, it should be understood that the shown embodiment is just an exemplary embodiment and that the capsule 1 in particular the capsule body 2 according to the invention can take various different embodiments.

The capsule 1 can be preferably a single-use or re-fillable capsule. The capsule can contain a dose for a single beverage, e.g., a single coffee cup, or multiple doses for more than one beverage. For single-use capsule, it preferably comprises a dished body 2 onto which an upper wall such as a perforable membrane 3 is sealed. Preferably, the membrane 3 is sealed onto a peripheral rim 4 of the body. The rim 4 preferably extends outwards forming an annular portion R between about 2-10 mm. The upper wall can also be a porous wall such as a filter paper or a woven or non woven layer that is sealed onto the rim 4. The upper wall can also be a combination of a perforable membrane and a porous wall as predefined.

The dished body comprises a bottom wall respectively bottom end 6 and a side wall 7 which preferably widens in direction of the large open end of the body opposed to the bottom wall 6. The dished body 2 is preferably rigid or semi-rigid. It can be formed of a food grade plastic, e.g., polypropylene, with a gas barrier layer such as EVOH and the like or aluminium or a laminate of plastic and aluminium, such as PP/Aluminium or PP/Aluminium/PET. By definition, the term "aluminium" encompasses here any alloy containing aluminium. The membrane 3 can be made of a thinner material such as a plastic film also including a barrier layer or aluminium alloy or a combination of plastic and aluminium alloy. The membrane 3 is usually of a thickness between 20 and 350 microns, for example. The membrane is perforated for creating the water inlet as will be described later in the description. The membrane also further comprises a perforable peripheral area 36.

In addition or in replacement to the membrane 3, the upper wall of the capsule 1 may comprise a rigid or semi-rigid lid member which preferably has the form of a disk of plastic comprising a central portion having an inlet port for enabling the introduction of a water injection member and a peripheral portion having circumferentially arranged outlet openings.

The membrane may also be provided, at least in its central region, with a dedicated liquid-tightness layer 41 as described in co-pending European patent application No. 09169679.9, such layer having the function of ensuring a liquid-tight arrangement between the perforating injection element of the device and the membrane to avoid leakage of liquid outside of the central perforation as will be later described.

The upper wall of the capsule 1 may as well be constituted by a removable lid member. Hence, a refillable capsule may be provided which essentially comprises a body 2 and a removable or attachable lid member. Thereby, the lid member may be connected to the body 2 of the capsule by e.g. a press-fitting joint.

The capsule is preferably designed as being rotationally symmetric about the central axis Z. Thereby, it should be noted that the capsule may not necessarily have a circular section around the axis Z but may take another form such as a square or polygonal form.

As shown in FIG. 1, the capsule body 2 comprises a cylindrical or slightly trunconical section 9, e.g. a stepped section. Preferably, the section has a low angle relative to a pure cylinder of about 7° (+/−1° tolerance); such angle simplifying the operation of forming the body, in particular, when deep-drawing an body made of thin aluminium. Thereby, the section 9 extends to a distance L2 perpendicular to the plane in which the membrane 3 is arranged. Distance L2 is preferably between 1 and 5 mm. Moreover, the stepped section 9 preferably comprises an outer diameter D2 which preferably lies between 45 and 55 mm. As a preferred example, outer diameter D2 is of 48.9 mm. It should be noted that the capsule according to the present invention may comprise a body portion 2 of different forms in order to accommodate a different amount of beverage substance within the enclosure 14 of the capsule. Accordingly, the indicated distance L1 between the bottom portion 6 and the rim 4 of the capsule may vary, preferably between 15 and 40 mm.

Thereby, the stepped section 9 with its outer diameter D2 enables a concentric positioning of the capsule 1 within a dedicated capsule holder 34 (see FIG. 5) having an inner diameter (not shown) designed for accommodating respectively enclosing the stepped section 9. Furthermore, the rim portion 4 is arranged to be positioned on an upper surface of said capsule holder 34 of the dedicated beverage production device in order to enable a stable support of the capsule.

As indicated in FIG. 1, the capsule according to the present invention is surrounded by a circumferential force ring 8 preferably protruding to the exterior of the capsule perpendicular to a plane in which the membrane 3 is arranged. Thereby, the force ring 8 comprises an outer diameter D1 which preferably lies between 50 and 70 mm. In a preferred example, outer diameter D1 is 58 mm. The force ring 8 constitutes an engagement member which is designed to be engaged by a dedicated pressing surface of a capsule enclosing member of the device.

FIG. 2 shows a sectional side view of the force ring 8 arranged at an outer circumferential portion of the rim 4 of the capsule body 2. Thereby, the force ring 8 extends upwardly from the flange-like rim 4 and is designed to form part of a valve means for selectively blocking and/or restricting the flow of the centrifugal liquid coming out of the capsule as will be explained later in the present description.

Thereby, the force ring 8 preferably extends to a height h from the plane in which the membrane 3 is arranged. Thereby, it is to be noted that the height h lies between 0.5 and 10 mm, most preferably between 0.8 and 8 mm, in order to adapt the back-pressure exerted by a dedicated pressing surface of a beverage production device to be used in conjunction with the present capsule. Thereby, it is to be understood that the greater the measure of height h is, the higher is the back pressure exerted by the pressing surface onto the force ring 8 of the capsule; therefore, the higher the overcoming pressure of the centrifuged liquid must be, to open the valve and maintained it opened.

In a preferred embodiment, height h of the force ring 8 of the capsule is preferably between 1.0 and 2.0 mm high in order to exert a high back-pressure onto the capsule which will resolve in a high crema quality and quantity, but as well in a proper flow rate.

However, for capsules from which large-volume type coffee beverages are to be prepared, the height of the sealing portion is preferably lower, i.e., between 0.5 and 1.4 mm such that an essential higher flow rate is obtained, at reasonable speeds (e.g., between 2500-8000 rpm) during beverage extraction without significantly reducing the crema quality and quantity.

As can be seen in FIG. 2, the force ring 8 is preferably an embossed portion forming a multi-ply arrangement 16. The force ring 8 is preferably of inverted U- or V-shaped form when seen in cross-sectional side view.

Thereby, the force ring 8 comprises an inner section 8a, a bent intermediate section 8b, and, optionally, an outer section 8c. The inner section 8a is preferably tilted by an angle α with respect to the central axis of rotation z of the capsule 1. Thereby, α is preferably between 2 and 15 degrees.

Moreover, the outer section 8c preferably extends in a direction essentially parallel to the central axis of rotation Z of the capsule 1. A lower circumferential edge 8d of said outer section 8c is preferably arranged at a distance "a" to a lower surface of the flange like rim 4 of the capsule 1. Thereby, the distance "a" lies preferably between 0.1 and 1 mm.

It is to be noted that the embossed force ring 8 is preferably made integral with the rim 4 and the capsule body 2. Accordingly, the multi-ply arrangement of the embossed ring 8 consists of preferably two plies 16a, 16b of the capsule's body material being folded at the edge 8d, to essentially an inverted U- or V-shaped form. Thereby, the inner section 8a, the bent intermediate section 8b and the outer section 8c in the shown embodiment are preferably formed by a first upper ply 16a. Moreover, a reentrant second ply 16b constitutes an embossed section of the multi-ply arrangement 16 and is bent inwardly from the lower circumferential edge 8d towards the capsule body 2.

Hence, a very stable force ring 8 is arranged at the circumference of the flange like rim 4 in order to present a rigid engagement portion for providing valve means when being engaged by a dedicated pressing surface of a beverage production device.

The force ring 8 is preferably formed such that its inner and outer sections 8a and 8c extend in horizontal direction to a width "b" which preferably lies between 1 and 5 mm.

Figure 3C:
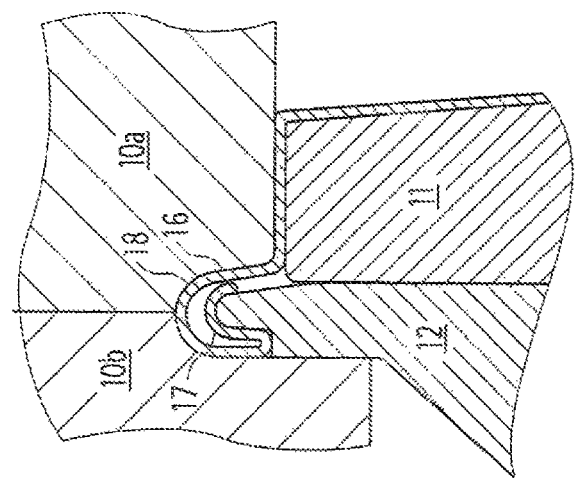
FIG. 3a-3c are sectional side views of the device for forming the embossed rim portion of the capsule according to the invention.
Figure 3B:
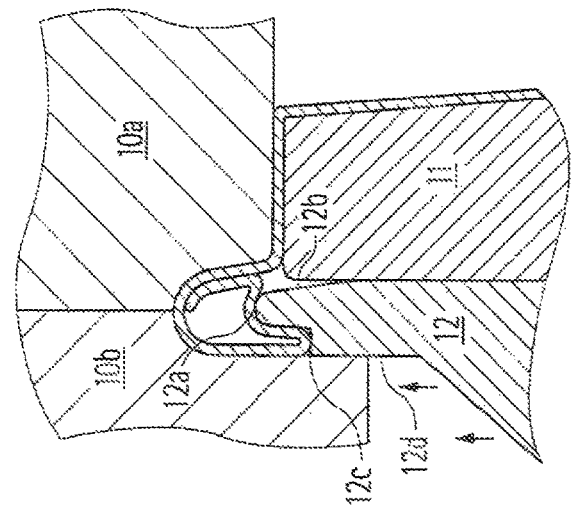
Figure 3A:
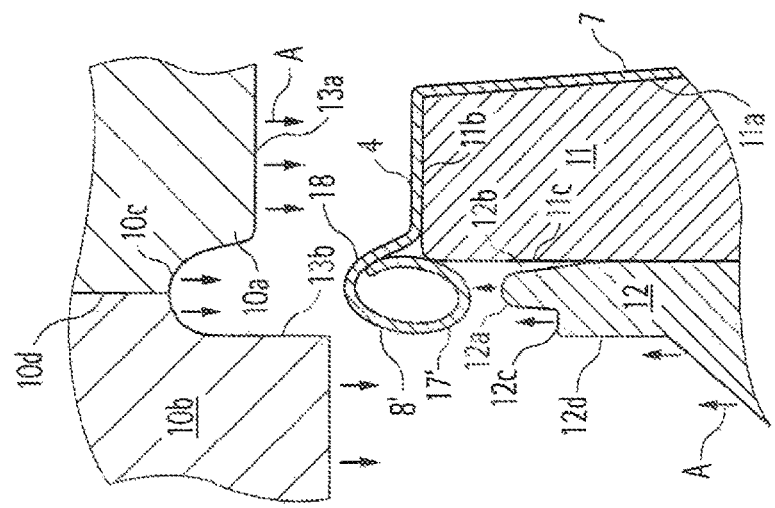
Figure 4:
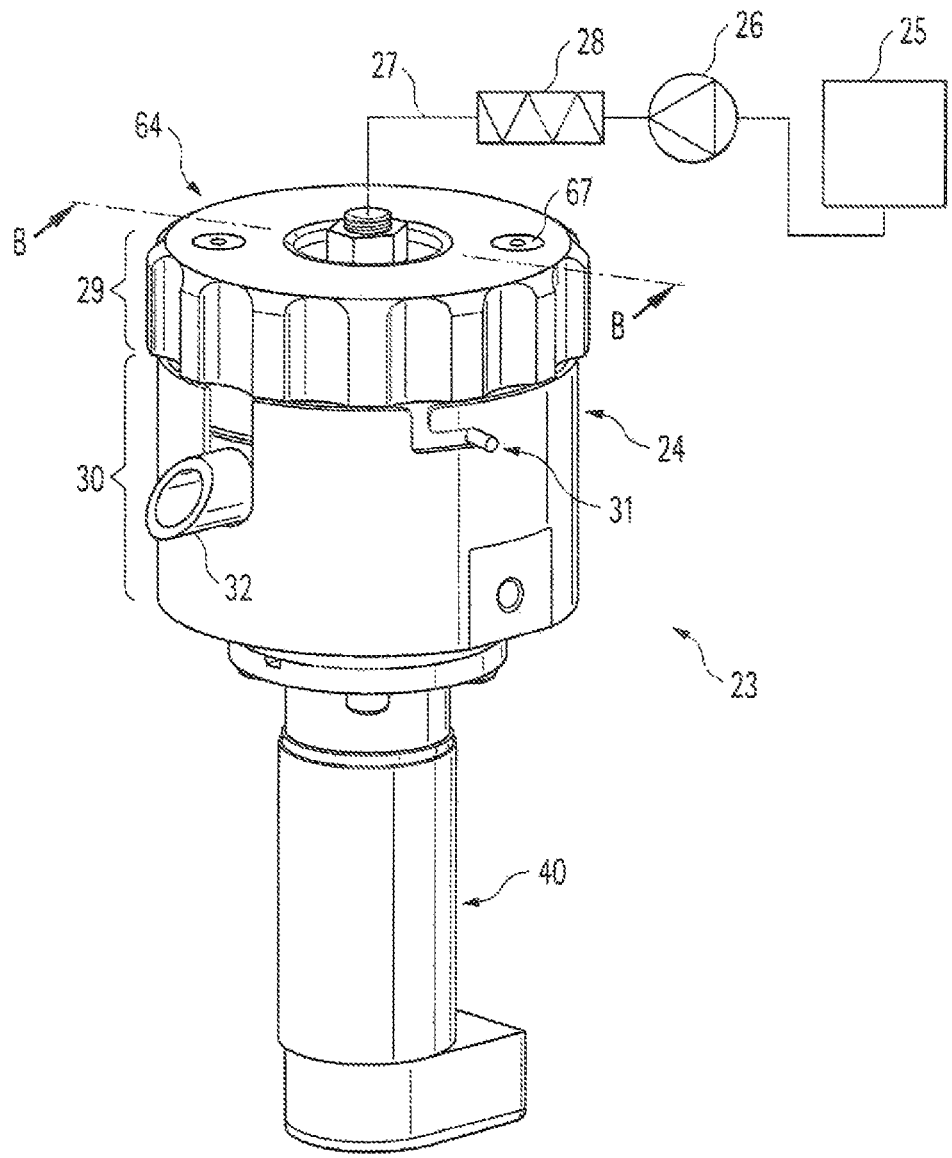
FIG. 4 is a perspective view of the beverage production device of the invention.

FIGS. 3a to 3c relate to the different steps used for forming the embossed force ring 8 of the capsule 1 according to the present invention.

As shown in FIG. 3a, before the forming of the annular rim portion of the capsule is performed, the capsule 2 is preferably formed by deep drawing in which the body 2 comprising the shown side wall 7 and rim portion 4 are integrally formed as a single piece. Thereby, the rim portion 4 comprises an outer annular curled portion 8' which may be formed as well during the deep drawing operation or can be formed by an additional forming step.

As shown in FIG. 3a, the capsule of such a configuration is preferably positioned in a dedicated supporting member 11 having a preferably cup-shaped inner surface 11a and an upper surface 11b which are complementary formed to the wall 7 and rim 4 of the capsule in order to provide a solid support during the forming process. Thereby, the supporting member 11 is preferably designed such that the curled section 8' extends to the circumference of the supporting member 8.

The curled section 8' preferably extends to the upper and lower direction perpendicular to the plane in which the flange like rim 4 is arranged.

A dedicated forming or embossing device further comprises an enclosing member preferably having a recess 10c which is shaped to support an upper convex portion 18 of the curled section 8' during the forming process. As indicated in the figure, the enclosing member may be constituted by two adjacent parts 10a, 10b which are positioned adjacent to each other at a joint face 10d which is preferably arranged at the provided recess 10c of the enclosing member. Accordingly, an intermediate member (not shown) may be provided in said joint face 10d to narrow or widen the recessed section 10c in order to adapt the resulting form of the embossed force ring 8.

The enclosing member may further comprises a planar surface 13a being arranged with respect to the recessed section 10c in order to form an enclosing section complementary formed to the capsule's rim 4 and curled section 8' in order to provide a stable support during the forming process.

The enclosing member preferably further comprises an annular enclosing surface 13b extending in direction of the axis of rotation Z (see FIG. 1) of the capsule in order to prevent the extension of the curled section 8' away from the body of the capsule during the forming process.

It has to be noted that the enclosing member is preferably shaped to provide a solid support for at least an upper convex portion 18 of the curled section 8' during the forming process. The shown geometrical shape of the enclosing member is however just an exemplary embodiment and thus, the enclosing member may be of any different shape designed to provide a support for at least said upper convex portion 18.

Furthermore, a dedicated forming or embossing device preferably comprises pressing means 12 which are preferably arranged at a circumference of the supporting member 11. Thereby, the pressing means 12 comprise an annular protrusion 12a which is preferably of inverted U- or V-shaped form and which is used as the tool for deforming the curled section 8'. Thereby, the protrusion 12a is preferably distanced from the outer surface 11c of the supporting member 11 by a slanted portion 12b. Thereby, the protrusion 12a is preferably arranged to press from below onto a central portion of the curled section 8' when seen in sectional side view.

The pressing means 12 may further comprise a stepped section 12c at its outer circumference which also helps to deform the curled section 8'.

As shown by arrows A, the enclosing member 10a, 10b and the pressing means 12 are preferably arranged to be moved with respect to each other in a direction parallel to the axis of rotation Z of the capsule body. Therefore, driving means such as a motor (not shown) may be coupled to the enclosing member 10a, 10b and/or the pressing means 12.

FIG. 3b relates to an intermediate step of the forming process in which an outer circumferential surface 12d of the pressing means 12 engages with the inner circumferential surface 13b of the enclosing means. Thereby, it is to be understood that before the pressing means 12 engage with the enclosing means, the enclosing means 10a, 10b are lowered and brought into contact with the rim 4 and the curled section 8' in order to enable a stable support for the capsule during the forming process.

As can be seen in FIG. 3b, the pressing means 12 press a lower convex portion 17' of the curled section 8' towards the enclosing member 10a, 10b. Thereby, the stepped portion 12c of the pressing means 12 prevents the curled section 8' from bypassing the pressing means and thus, enables the pressing means to press the curled section 8' into a pre-defined shape as defined by the recessed portion 10c. Furthermore, due to the slanted surface 12b of the pressing means 12 the curled section 8' is enabled to partially yield towards a space present between pressing means 12 and the supporting member 11. Accordingly, a multi-ply arrangement as shown in FIG. 3c which is essentially of inverted U-respectively V-shaped form is obtained by the forming process. In particular, the lower convex portion 17' of the curled section 8' is embossed into the opposite convex portion 18 of the curled section 8' and thus, formed to a reentrant portion 17 (see FIG. 3c). Accordingly, a rigid and stable force ring 8 is formed at the circumference of the flange like rim 4 which is integrally formed with the capsule body 2.

After the forming process, the enclosing member 10a, 10b and the pressing means 12 may preferably be distanced from each other in order to eject the capsule 1 from the supporting member 11.

Instead of the shown embodiment in which pressing means 12, an enclosing member 10a, 10b and a support member 11 are provided, the method according to the invention may as well be carried out by use of another arrangement such as a mould of different geometrical form.

Moreover, in particular the shown pressing means 12 are just an exemplary embodiment and thus, the pressing means may be of any particular geometrical shape in order to enable an embossing of the curled section 8' in the direction opposite to the body. As an alternative for example, instead of the shown solid pressing means 12, embossing of the curled section 8' may be obtained by applying pressurized air or liquid onto at least the convex portion 17' of the curled section 8'.

A preferred embodiment of a system including a capsule of the invention and a beverage preparation device is illustrated in FIGS. 4 to 8 and is described in the following.

The system comprises a capsule 1 as aforementioned and a beverage preparation device 23. The device has a module 24 which a capsule can be inserted in. The capsule contains a food substance for being brewed and the capsule is removed from the module after use for being discarded (e.g., for waste or recycling of the organic and inorganic raw materials). The module 24 is in fluid communication with a water supply such as a water reservoir 25. A fluid transport means such as a pump 26 is provided in the fluid circuit 27 between the module and the water supply. A water heater 28 is further provided to heat water in the fluid circuit before water enters the module. The water heater can be inserted in the fluid circuit to heat fresh water coming from the reservoir. Alternatively, the water heater can be placed in the water reservoir itself that becomes a water boiler in such case. Of course, water can also be taken directly from a domestic water supply via a water plug connection. The device may further comprise control means and activation means for activating the beverage preparation method (not illustrated).

Water can be fed in the module 24 at low pressure or even at gravity pressure. For example, a pressure of between 0 and 2 bar above atmospheric pressure can be envisaged at the water inlet of the module. Water at higher pressure than 2 bar could also be delivered if a pressure pump is utilized such as a piston pump.

The brewing module 24 can comprise two main capsule encasing sub-assemblies 29, 30; mainly comprising a water injection sub-assembly or water injection head and a liquid receiving subassembly including a capsule holder. The two subassemblies form positioning and centring means for referencing the capsule in rotation in the device.

Figure 5:
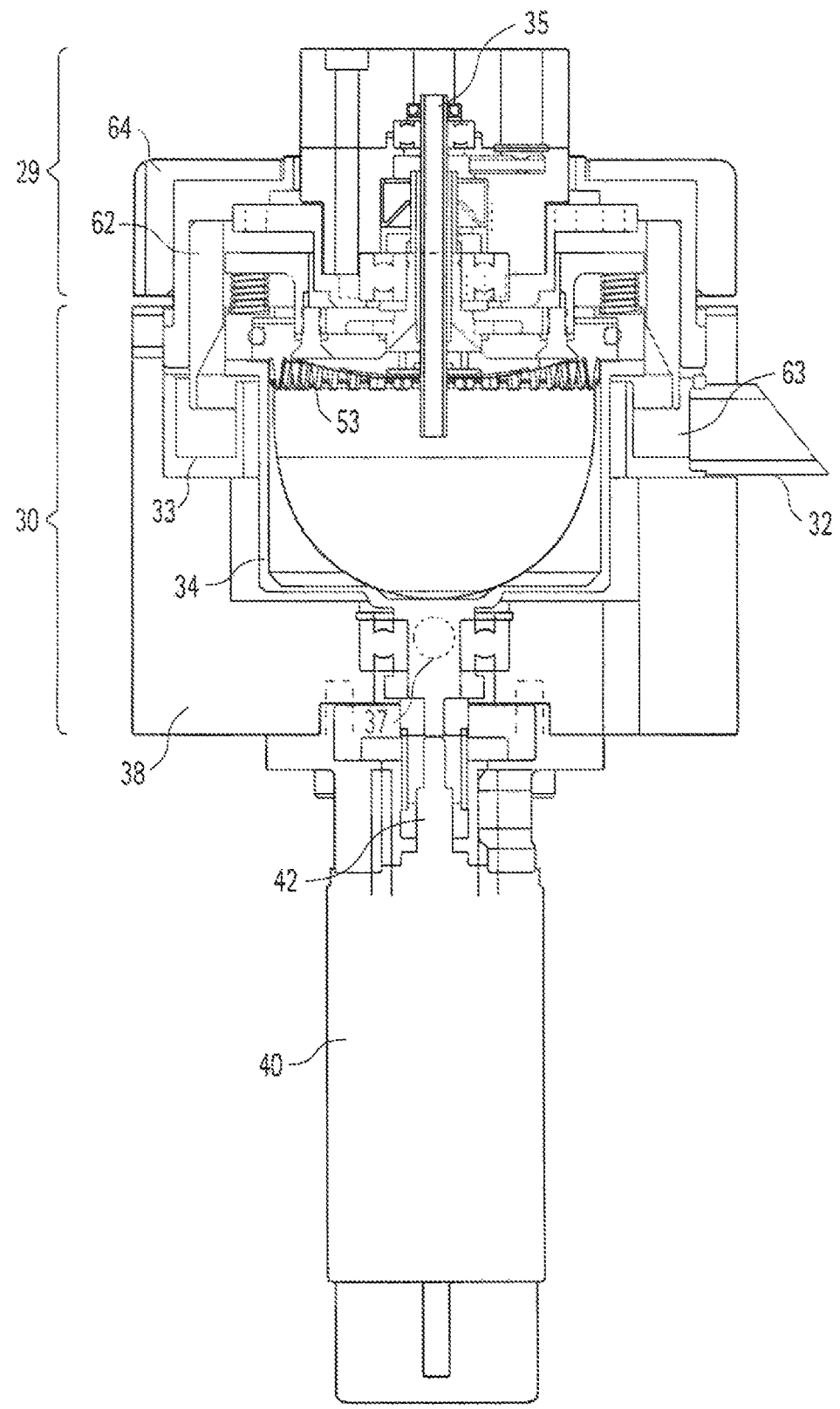
FIG. 5 is a sectional side view of a beverage production device with a capsule inside.

The two subassemblies close together to encase a capsule therein for example by a bayonet-type connection system 31 or any other suitable closure means such as a mechanism based on a jaw-type closure principle. The liquid receiving subassembly 30 comprises a liquid duct 32, for example, protruding on a side of the subassembly for guiding the centrifuged liquid coming out of the capsule to a service receptacle such as a cup or glass. The liquid duct is in communication with a liquid receiver 33 forming a U-like or V-like shaped annular section surrounding a capsule holder comprising a rotating drum or capsule-holder 34 into which the capsule can be inserted as illustrated in FIG. 5. The liquid receiver 33 defines a collecting cavity 63 for collecting the liquid as will be explained later in the description. Below the liquid receiving subassembly 30, are placed means for driving the capsule receiving drum 34 in rotation inside the subassembly.

The driving means preferably comprise a rotary motor 40 which can be supplied by electricity or gas power.

The water injection subassembly comprises a water inlet side comprising a water inlet 35 communicating upstream with the water fluid circuit 27.

The rotary drum 34 prolongs itself axially by a rotating shaft 37 which is maintained in rotational relationship relative to an outer base 38 of the liquid receiver 33 by a rotational guiding means 39 like a ball bearing or needle bearing. Therefore, the rotary drum is designed to rotate around a median axis I whereas the outer base 38 of the receiver is fixed relative to the device. A mechanical coupling can be placed at the interface between the rotating shaft 37 of the drum and the shaft 42 of the motor 40.

Considering the water injection subassembly 29, it comprises a centrally arranged water injector 45 which is fixed relative to longitudinal axis I of the device. The water injector comprises a central tubular member 46 for transporting water from the inlet 35 to a water outlet 47 that is intended to protrude inside the enclosure 14 of the capsule. The central tubular member extends by a hollow needle 90 for intruding in the capsule and injecting liquid therein. For this, the water outlet is associated by a puncturing means such as a sharp tubular tip 48 that is able to create a punctured hole through the membrane lid 3 of the capsule.

About the water injector is mounted an enclosing member respectively a rotary engaging part 49. The engaging part 49 has a central bore for receiving the water injector and rotational guiding means such as a ball or needle bearing 50 inserted between the part 49 and the end of the injector 45. A sealing means 89 is positioned between the ball bearing 50 and the injection needle 90 for preventing any possible ingress of liquid from the capsule inside the bearing.

The capsule engaging subassembly 29 may further comprise a tubular portion of skirt 62 which protrudes in the internal annular chamber 63 of the liquid receiving subassembly 30 when the two subassemblies are closed relatively one another about a capsule. This tubular portion of skirt 62 forms an impact wall for the centrifuged liquid which exits the centrifuged capsule. This portion 62 is preferably fixed on the subassembly 29. The subassembly further comprises a handling portion 64 for facilitating the connection on the liquid receiving subassembly 30. This handling portion 64 can have a knurled peripheral surface for handling. The handling portion can be fixed on the fixed base of the subassembly 29 by screws 67.

This portion could of course be replaced by a lever mechanism or a similar handling means.

Figure 6:
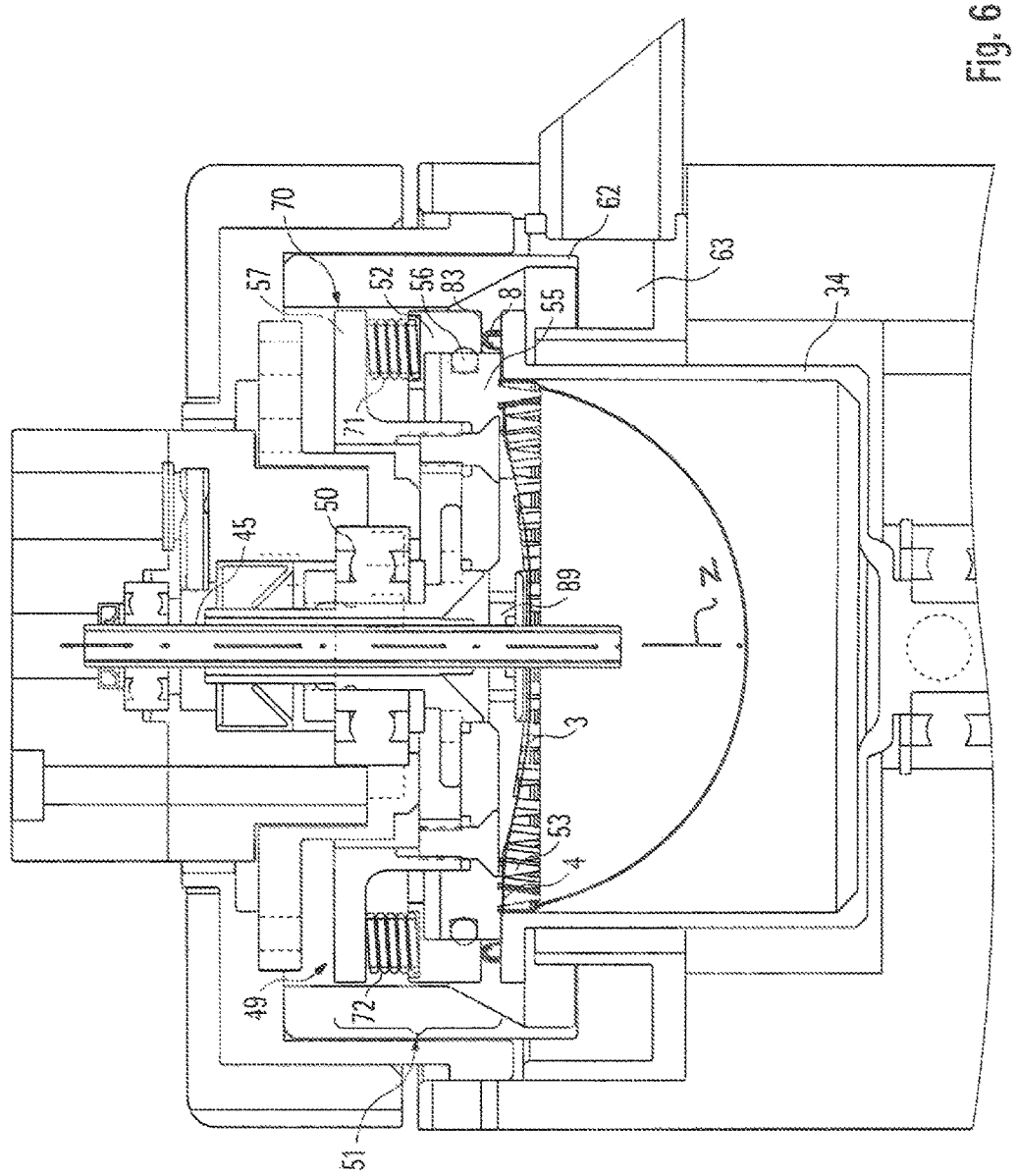
FIG. 6 is a detailed sectional side view of the view of FIG. 5 in a closed configuration of the valve means.

According to the invention, the rotary engaging part comprises perforating members 53 located at the periphery of the part (FIG. 6). The perforating members are placed for perforating the membrane 3 of the capsule at its periphery, more particularly, in the annular peripheral area of the top membrane 3 of the capsule. More particularly, the perforating members are formed of sharp projections protruding from the lower surface of the engaging part. The membrane is preferably perforated when the water injection subassembly 29 is moved relative to the capsule, when the capsule is in place in the capsule holder of the lower subassembly 30, during closure of the device, i.e., of the two sub-assemblies 29, 30, about the capsule.

The perforating elements are preferably distributed along a circular path of the part and close to the rim of the capsule.

In a preferred mode, the perforating members 53 are solid (i.e., not traversed by a liquid supply conduit) at the tip.

A valve means 51 is provided in the system in the flow path of the centrifuged liquid downstream of the perforating elements. The valve means can be any suitable valve providing opening or enlargement of the flow path of the centrifuged liquid leaving the capsule when a given threshold of pressure is attained. The valve means is so calibrated to open at a given pressure. Such calibration is essentially carried out by the force ring of the capsule in function of its height or thickness. For instance, the opening pressure is of about 0.5 to 4 bar, preferably of about 1-2 bar, of pressure (above atmospheric pressure).

In the preferred mode, as illustrated, the valve means 51 of the system comprises an engagement portion, i.e., a force ring 8 of the capsule 1, which projects from the flange-like rim 4 of the capsule. This portion of engagement preferably forms a projection extending upwards from the substantially flat surface of the rim 4. The force ring 8 is preferably formed integrally from the flange-like rim. On the opposed side, the valve means comprises an engaging surface respectively pressing surface 83 of the rotary engaging part 49. The engaging surface 83 is part of an annular pressing portion 52 of the engaging part 49. The pressing portion 52 is mounted around the perforating plate 55 bearing the perforating members 53. A sealing element such as an O-ring 56 is also placed between the central plate 55 and the annular pressing portion 55. The perforating plate 55 may have a convex shape to ensure a pressure of contact in the centre of the capsule in order to reduce leakage of liquid outside the central perforation of the membrane.

The pressing surface 83 may comprise various shapes depending on the particular shape of the force ring 8. In a preferred mode, the engaging surface 83 is a substantially planar surface such as an annular flat surface. The engaging surface may be formed as an annular recessed portion of surface at the periphery of the lower surface 54 of the rotary engaging part 49 thereby allowing the base of perforating members to be lower than the base of the force ring 8.

It should be noted that the engaging surface 83 may take many different shapes other than flat such as concave or convex.

The valve means 51 is designed to close under the force of a resilient closure load obtained by a load generating system 70 comprising spring-biasing elements 71, 72 (see FIG. 6). The spring-biasing elements 71, 72 are inserted between pressing portion 52 and an annular support base 57. The elements 71, 72 apply a predefined resilient load onto the rotary pressing portion 52. The spring-biasing elements can be formed of two, three, four or more helicoidal springs. Since the pressing portion 52 is biased against the force of the springs 71, 72 independently from the central perforating plate 55, it can move relative the plate as a response to the insertion of the capsule in the device. Thereby, the load primarily distributes itself onto the engaging surface 83 acting in closure against the force ring 8 of the capsule. While the annular pressing portion 52 retracts more or less depending on the thickness or height of the force ring 8, the perforating plate 55 takes a fixed position of engagement against the capsule thereby ensuring a reliable and reproducible surface area of perforations into the membrane 3 of the capsule.

Figure 7:
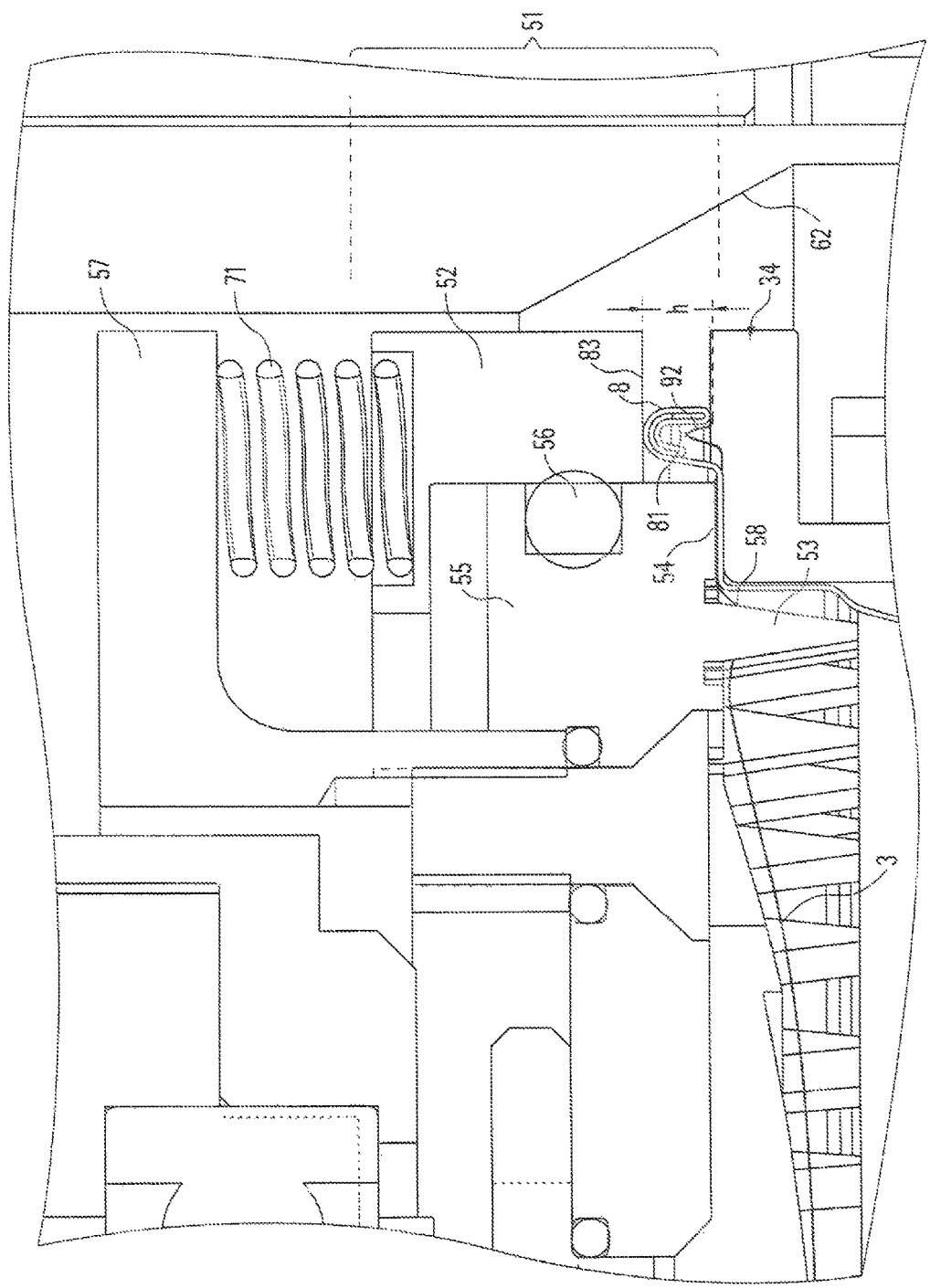
FIG. 7 is an enlarged sectional side view of the view of FIG. 6 in a closed configuration of the valve means.
Figure 8:
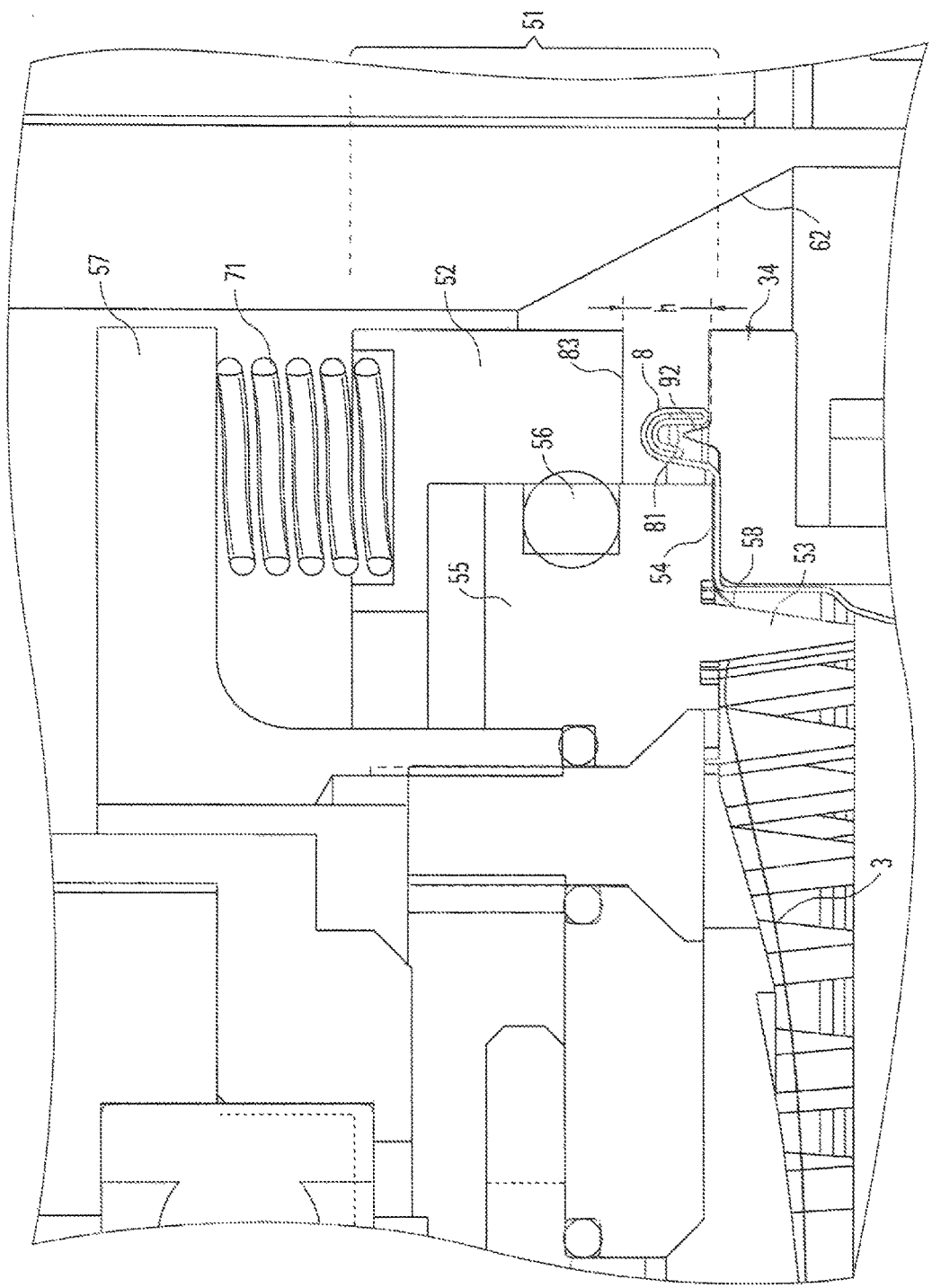
FIG. 8 is an enlarged sectional side view of the view of FIG. 6 in an open configuration of the valve means.

As illustrated in FIG. 7, the valve means normally closes off the flow path for the centrifuged liquid until a sufficient pressure is exerted on the force ring 8 by the centrifuged liquid exiting through the orifices 58 created by the perforating elements in the membrane 3. The liquid flows thus between the membrane 3 and the upper surface 54 of the perforating plate 55 and forces the valve 51 to open by pushing the annular pressing surface 52 upwards relative to central plate 55, against the force of the spring-biasing elements 71, 72, as illustrated in FIG. 8. The centrifuged liquid can thus be ejected at a high velocity on the impact surface 62.

As illustrated in FIG. 8, the capsule holder 34 of the device may comprise a support portion. The support portion forms a stepped edge with an inner part and an outer part; wherein the inner part is lowered relatively to the outer part in a manner to be engaged, respectively, by the sealing portion of the rim and the force ring of the rim. The force ring of the capsule comprises circumferential edge 8d which is distanced from the plane of the sealing portion of the flange-like rim thereby enabling a firm support onto the outer part of the support portion of the capsule holder.

Furthermore, the support portion comprises a support surface from which extends an annular indentation 92 which matches the shape of the inner recess 81 (see also FIG. 2) of the force ring 8. Hence, the indentation 92 can serve to position and reference the capsule in the device as well as to support the annular projection 8 of the valve means when being compressed by the rotary part 49. Preferably, the counter-shape 81 of the embossed force ring 8 is specifically formed by the above described forming process in order to receive the indentation 92 (optional means) of the provided capsule holder.

It should be noticed that the spring-biasing means for exerting the load on the valve means can be designed differently. For instance, the spring-biasing means 71, 72 can be a rubber band or ring or any equivalent resilient structure.

The closing force adjustment of the valve means respectively the restriction of the flow path between the force ring 8 and the pressing surface 83 of the device is obtained by the dimension of the force ring which is specific to the inserted capsule engaged in the beverage preparation device. Thereby, due to different height h of the force ring 8 the back-pressure of the valve means respectively the restriction of the liquid flow path between the capsule and the outlet 32 of the device can be adjusted to meet predefined needs. Thereby, for a fixed predefined closure load onto the force ring of the capsule, the back-pressure can be adapted by the height of the force ring 8 in order to adapt in particular the flow rate, the crema quality and/or the crema quantity of the beverage to be prepared.

As illustrated in FIG. 8, the lower surface 54 of the rotary perforating plate 55 preferably comprises a series of perforating elements or projections 53 being distributed in a circular pattern in a peripheral region of the surface. Each perforating element 53 will produce a perforation 58 in the upper membrane of the capsule and therefore a passage for the centrifuged liquid for leaving the capsule engaged in rotation. If necessary, the number of perforating elements can be changed by removing the plate and replacing it by a plate having a higher number of perforating elements.

During operation of the capsule 1 placed into the system according to the invention, the capsule 1 is rotated about its axis Z. Thereby, liquid which is centrally injected into the capsule 1 through the injection needle 90 will tend to be guided along the inner surface of the side wall of the body, up to the inner side of the membrane, and then through the outlet openings created by the projections 53. Due to the centrifugation of the liquid provided centrically to the capsule 3, the liquid and the substance within the enclosure 14 of the capsule 1 are made to interact in order to form a liquid comestible.

Figure 9:
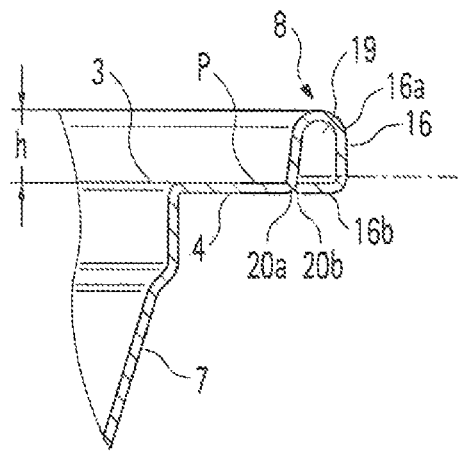
FIG. 9 is a sectional side view of another preferred embodiment of the rim portion of the capsule comprising a double ply arrangement.
Figure 12:
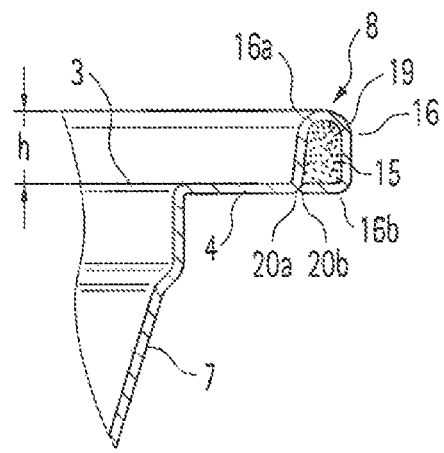
FIG. 12 is a sectional side view of another preferred embodiment of the rim portion of the capsule comprising a double ply arrangement with a filling portion.

FIGS. 9 and 12 show a sectional side view of other preferred embodiments of the rim portion 4 of the capsule 1 comprising another double-ply arrangement. Thereby, the curved folded part 16 of the rim portion 4 is formed such that an upper ply 16a of the part 16 is of essentially inverted U-shaped form.

Moreover, a lower ply 16b of the part 16 is bent inwardly, i.e. towards the body 2 of the capsule 1, such that a hollow annular space 19 is formed between the two plies 16a, 16b. Thereby, the ply 16b is preferably arranged parallel to a plane P in which the upper wall 3 of the capsule 1 extends. Moreover, an annular edge 20b of the ply 16b may be arranged adjacent to an inner circumferential edge 20a of the upper ply 16a.

As shown in the figures, the curved folded part 16 preferably extends, beyond a plane P in which the upper wall 3 is arranged, in the opposite direction of the body 2. Thereby, the flange-like rim 4 is preferably free of any downward extension below the plane P to form a stable support onto the edge of the capsule holder (The lower ply 16b being here not considered as a downward extension below plane P but a transversal extension adjacent to the sealing portion of the flange-like rim).

Furthermore, the curved folded part 16 preferably extends to a height h from the plane P in which the upper wall 3 is arranged.

As shown in FIG. 9, a hollow structure is formed by the plies 16a, 16b which forms a rigid force ring 8. Alternatively, the hollow structure respectively hollow space 19 as shown in FIG. 9 may as well be filled by a dedicated filling and/or reinforcing material 15 in order to further enhance the rigidity of the structure of the force ring 8 as shown in FIG. 12. Thereby, the filling material 15 may be any material to be dispensed or provided to the hollow space 19 such as e.g. solid or granular plastic material.

Figure 10:
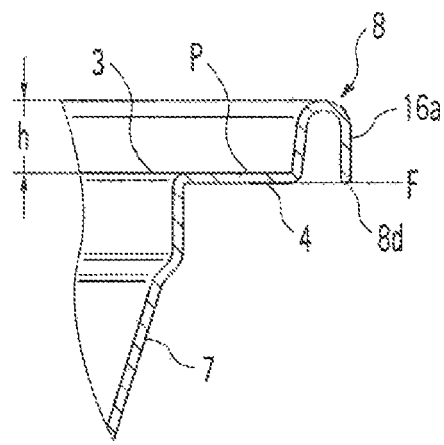
FIG. 10 is a sectional side view of another preferred embodiment of the rim portion of the capsule comprising a single ply arrangement with a free end section.
Figure 11:
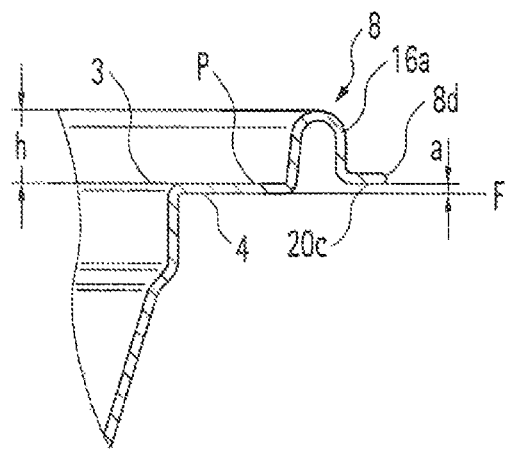
FIG. 11 is a sectional side view of another preferred embodiment of the rim portion of the capsule comprising a single ply arrangement with an annular section.

FIGS. 10 and 11 show another preferred embodiments of the rim portion of the capsule comprising a single ply arrangement according to the present invention.

As shown in FIGS. 10 and 11, the force ring 8 comprises a single ply 16a being formed in essentially inverted U-shaped form. Thereby, the single ply 16a extends to a height h from plane P in which the upper wall 3 of the capsule 1 is arranged.

According to the embodiment of FIG. 10, the single ply 16a comprises an outer circumferential edge 8d which delimits the single ply 16a. Thereby, the outer circumferential edge 8d preferably does not extend over a plane F in which a lower surface of the rim portion 4 of the capsule is arranged towards the body 2 of the capsule 1. More preferably, the lower surface of the rim portion 4 and the outer circumferential edge 8d are arranged in a common plane F such that the lower surface of the rim portion 4 and the circumferential edge 8d may provide a stable support of the capsule 1 when being engaged by a dedicated enclosing member of a beverage production device. However, the circumferential edge 8d may as well be distanced from plane F by a distance "a" as explained for example with respect to the embodiment according to FIG. 2.

As shown in FIG. 11, the single ply 16a of the force ring 8 may as well comprise an outer annular end portion 20c which is arranged essentially parallel to the plane P in which the upper wall 3 of the capsule 1 is arranged. Thereby, the annular portion 20c is preferably delimited by an outer circumferential edge 8d.

The annular portion 20c is preferably distanced by a distance a from plane F in which the lower surface of the rim portion 4 of the capsule 1 is arranged. However, the distance a may as well be '0' such that the annular portion 20c lies within the same plane F in which the rim portion 4 is arranged.

Although the present invention has been described with reference to preferred embodiments thereof, many modifications and alternations may be made by a person having ordinary skill in the art without departing from the scope of this invention which is defined by the appended claims.

The invention claimed is:

1. A method for producing a beverage using a capsule in a centrifugal beverage producing device, the method comprising:

placing the capsule in the centrifugal beverage production device for preparing the beverage from a substance contained in the capsule by introducing liquid in the capsule and passing the liquid through the substance using centrifugal forces, the capsule comprising a body comprising a bottom end and an open end, an upper wall for covering the body at the open end, an enclosure between the body and the upper wall containing a predetermined amount of the substance, and a flange-like rim extending outwardly from the body, wherein the flange-like rim comprises an annular force ring designed for being engaged by an enclosing member of the centrifugal beverage production device, wherein the annular force ring comprises at least one curved, folded part formed of at least a first folded ply and a second folded ply, the first folded ply forms (i) an inner section tilted at an angle with respect to a central axis of rotation of the capsule, (ii) a bent intermediate section extending from the inner section, and (iii) an outer section extending from the bent intermediate section to a lower circumferential edge in a direction essentially parallel to the central axis of rotation; and the second folded ply forms a section of the annular force ring bent inwardly from the lower circumferential edge toward the body of the capsule, and wherein the curved, folded part of the annular force ring extends, in a direction away from the body of the capsule and beyond a plane in which a portion of the flange-like rim is sealed on the upper wall, by a distance of extension from the plane; and centrifuging the capsule wherein in the centrifugal beverage producing device the annular force ring is engaged by the enclosing member of the centrifugal beverage production device, the annular force ring forming part of a valve for selectively blocking and/or restricting a flow of the liquid coming out of the capsule.

2. The method of claim 1, wherein the capsule further comprises an upper wall with an annular dedicated outlet area which is positioned circumferentially distant from the central axis above the enclosure to enable the beverage to be released from the capsule by effect of the centrifugal forces exerted in the capsule when rotated along the central axis in the beverage producing device.

3. The method of claim 1, wherein an external diameter of the annular force ring is between 50 and 70 mm.

4. The method of claim 1, wherein the curved, folded part of the annular force ring is a pressed section of the flange-like rim.

5. The method of claim 1, wherein the rim comprises a portion extending from the body to the curved, folded part and having the same thickness of each of the first folded ply and the second folded ply.

6. The method of claim 1, wherein the first folded ply and the second folded ply are substantially adjacent including a reentrant ply.

7. The method of claim 1, wherein the first folded ply and the second folded ply are distant to form a hollow structure or a filled structure containing a filling and/or reinforcing material.

8. The method of claim 1, wherein the distance of extension is between 0.5 mm and 10 mm.

9. The method of claim 1, wherein the flange-like rim is free of any downward extension below the plane or has an extension shorter than the distance of extension above the plane.

10. The method of claim 1, wherein the curved, folded part of the annular force ring is integrally formed with the body of the capsule.

11. The method of claim 1, wherein the annular force ring is an inverted U- or V-shaped open form when viewed in a transversal cross section.

12. The method of claim 1, wherein the annular force ring is made of aluminium or a multilayer of aluminium and polymer.

* * * * *